INVENTOR.
Donald B. Tschudy
BY
ATTORNEY

United States Patent Office 2,778,585
Patented Jan. 22, 1957

2,778,585

DYNAMIC LIFT AIRSHIP

Donald B. Tschudy, Canton, Ohio, assignor to Goodyear Aircraft Corporation, Akron, Ohio, a corporation of Delaware Application January 3, 1955, Serial No. 479,532

5 Claims. (Cl. 244—30)

This invention relates to the construction of an airship and in particular to that of a non-rigid airship adapted to be started under a load greater than that of its gas lifting capacity.

Heretofore it has been known to successfully start non-rigid airships of round cross-sectional shape at an overload by dynamic lift. This was made possible by forward movement of the airship at a certain speed and angle of attack whereby sufficient dynamic lift was created to overcome the overload. However, the speed at which an airship on the ground can travel safely is limited and, accordingly, its dynamic lift. The prior art also discloses rigid airships of lenticular cross-sectional shape intended to be operated with overload but containing specific features inapplicable for non-rigid airships and which are impractical or inefficient.

It is the general object of the invention to avoid and overcome the foregoing and other difficulties of and objections to prior art practices by giving the airship envelope a longitudinally curved streamlined airfoil shape of substantially greater width than height in order to impart to the airship greater dynamic lift for a given angle of attack.

Another object of the invention is to keep the gas pressure low in the airship envelope and also the lateral air resistance of the airship in ground handling.

A further object of the invention is to reduce the airship starting distance for dynamically lifting a certain overload.

The aforesaid objects of the invention and other objects which will become apparent as the description proceeds are achieved by providing a non-rigid airship, movable on wheels, with an envelope which at a certain airship speed will have a greater dynamic lift than an envelope of round cross-section but of the same gas capacity. This is achieved by giving the envelope, longitudinally, a streamlined airfoil shape and a cross-sectional shape of lobed circumference having a width of from about one and a half to about two and a half of that of its height and having the joints of adjacent lobes along the top and bottom of the envelope connected by catenaries and cables, thus dividing the envelope into longitudinal sections. Whereas the outer envelope sections have a semi-circular cross-section of variable radius, the sections therebetween have a substantially rectangular cross-section. Because of the much wider bottom surface of the envelope the dynamic unit pressure will be smaller for lifting a certain overweight and require a smaller angle of attack for starting, or a greater overload may be carried at the same angle of attack than with an envelope of round cross-section of the same gas capacity.

Figure 1:
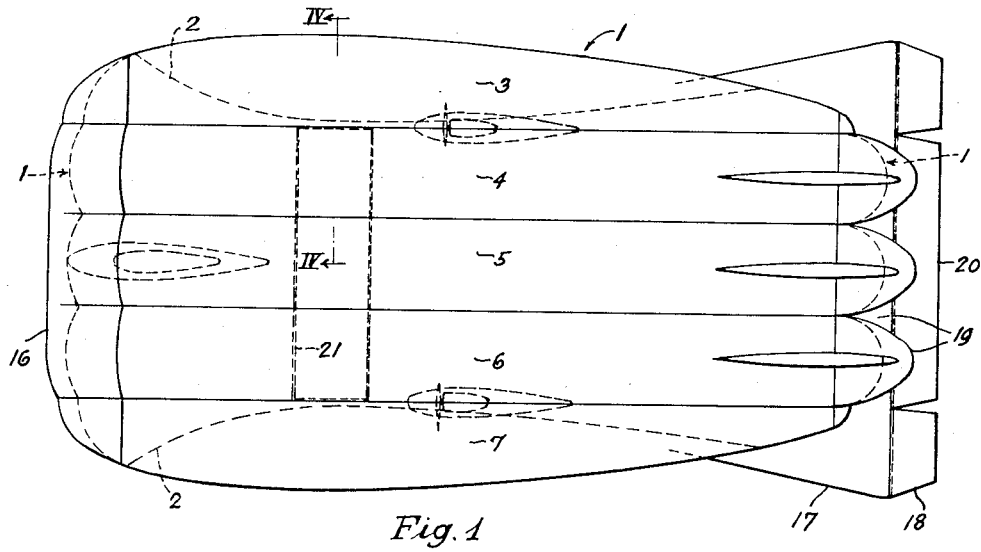
Figure 2:
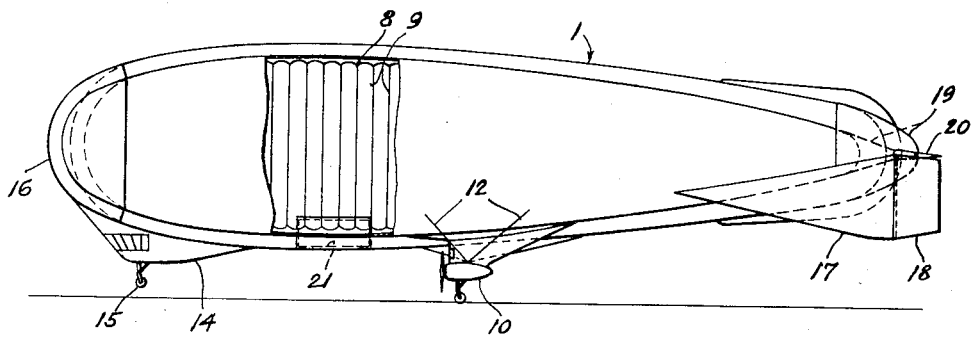
Figure 3:
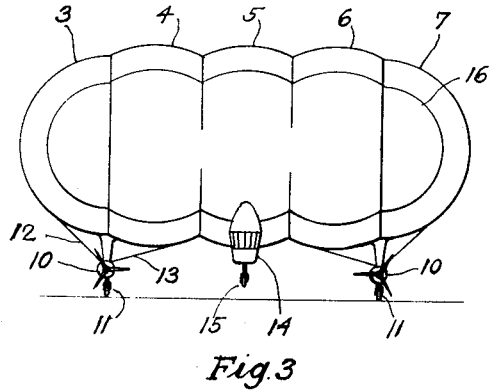
Figure 4:
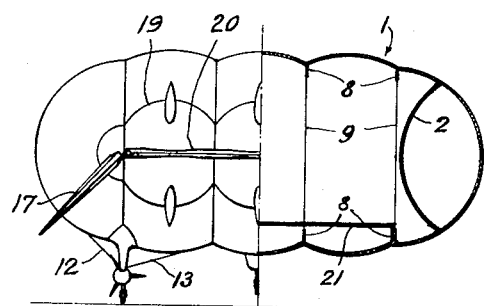

For a better understanding of the invention reference should be had to the accompanying drawing wherein Fig. 1 is a plan view of one embodiment of the invention, Fig. 2 is a side view thereof, with envelope wall partly removed, Fig. 3 is a front view, and Fig. 4 is one half of a rear view and one half of a cross-sectional view taken on line IV—IV of Fig. 1.

With specific reference to the form of the invention illustrated in the drawings, the numeral 1 indicates in general the streamlined lifting gas envelope made of gas-tight impregnated fabric symmetrical to a vertical and to a horizontal plane and which has a lobed cross-sectional circumference. The envelope 1, including air compartment diaphragms 2, consists of five longitudinal sections 3, 4, 5, 6 and 7. The outer sections 3 and 7 have semi-circular cross-sections, and the sections 4, 5 and 6, which are alike, substantially rectangular cross section. From the joint line of adjacent lobes extend catenaries 8 at top and bottom of the envelope, which are connected by cables 9 of proper length to determine the desired longitudinal contours of the envelope after inflation. A pair of power units 10 provided with landing wheels 11 attached thereto is located at the intersecting lines of the envelope sections 3—4 and 6—7 and supported by cables 9. Additional cables 12 and 13 secure the power units 10 against lateral movement. In the center and near the front of the envelope 1 is attached thereto the control car 14, provided with a landing wheel 15, and partly connected to the rigid front structure 16 protecting the bow of the envelope to the stern of the envelope are attached fins 17 extending radially from the outer envelope sections 3 and 7 at angles of 45° to the vertical and which carry rudders 18. A rigid structure 19 attached to and covering the stern of the envelope 1 is also connected to the fins 17 and carries the elevator 20. A cargo space structure 21 at the bottom within the envelope 1 substantially at the center of its aerodynamic lift may be installed and made accessible from the control car as well as from the outside for servicing.

It is to be understood that the invention shall not be restricted to the example illustrated in the drawing but that many variations may be made as to cross-sectional contours and sectional divisions of the envelope. Also, instead of using catenaries and tie cables between adjacent envelope sections, fabric walls provided with openings for intercommunication of the sections may be used. Furthermore, the air ballonets may be placed, just as well, into the envelope center sections.

From the foregoing description it will be recognized that the objects of the invention of increasing the dynamic lifting capacity of the airship have been achieved and that the distances of the starting runs will be reduced to a minimum.

While certain representative embodiments and details have been shown for the purpose of illustrating the invention, it will be apparent to those skilled in this art that various changes and modifications may be made therein without departing from the spirit or scope of the invention.

What is claimed is:

1. A non-rigid airship including a fabric body portion containing lifting gas and shaped like an airfoil so as to provide increased aerodynamic lift in the forward flight of the airship, a load-carrying compartment positioned in the body portion substantially at the center of dynamic lift of the body portion, a pair of engine nacelles mounted rearwardly of the compartment and at opposite sides of the body portion, a landing wheel carried by each nacelle, a control cabin mounted at the center of the front of the body portion, a landing wheel carried by the cabin, reinforcing means stiffening the entire bow of the body portion, reinforcing means stiffening the stern of the body portion, and elevator and rudder means mounted on the last-named means of the body portion.

2. A non-rigid airship including a fabric body portion containing lifting gas and shaped like an airfoil so as to provide increased aerodynamic lift in the forward flight of the airship, a pair of engine nacelles mounted rearwardly of the center of gravity of the body portion and at opposite sides of the body portion, a landing wheel carried by each nacelle, a control cabin mounted at the center of the front of the body portion, a landing wheel carried by the cabin, reinforcing means stiffening the entire bow of the body portion, reinforcing means stiffening the stern of the body portion, and elevator and rudder means mounted on the last-named means of the body portion.

3. A non-rigid airship including a fabric body portion containing lifting gas and shaped like an airfoil so as to provide increased aerodynamic lift in the forward flight of the airship, a pair of engine nacelles mounted rearwardly of the center of gravity of the body portion and at opposite sides of the body portion, a landing wheel carried by each nacelle, a control cabin mounted at the center of the front of the body portion, a landing wheel carried by the cabin, reinforcing means stiffening the entire bow of the body portion, and elevator and rudder means mounted on the rear of the body portion.

4. For a non-rigid airship, a lifting gas envelope of streamlined airfoil shape symmetrical to a longitudinally-extending vertical plane and to a horizontal plane, respectively, and having a lobed transverse cross-sectional contour of greater width than height, means for connecting at proper distance in substantially parallel longitudinal vertical planes the opposite sides of adjoining envelope lobes along their edges and dividing the envelope into a plurality of lobed longitudinal sections, the outer sections of the envelope being of semi-circular cross-section, a lifting gas filling the sections and passing from one section freely to another, and air ballonets positioned substantially the full length of the outer side of each outer section and adapted to be pressurized to pressurize all of the lifting gas to hold the non-rigid envelope in airfoil shape.

5. In a non-rigid airship an envelope, lifting gas in the envelope, said envelope being of streamlined airfoil shape symmetrical to a longitudinally-extending vertical plane and to a horizontal plane and having a lobed transverse cross-sectional contour of greater width than height, catenaries extending from the intersecting lines of adjoining lobes of the envelope and to divide it into sections, the inner sections of which having substantially rectangular cross-section and arcuate tops and bottoms, and the outer sections of which have semi-circular cross-section, air ballonets positioned in at least certain of said sections and adapted to be pressurized to pressurize all of the lifting gas to hold the non-rigid envelope in airfoil shape.

References Cited in the file of this patent

UNITED STATES PATENTS

| | | |
|---|---|---|
| 678,114 | Farr | July 9, 1901 |
| 992,909 | Schutte | May 22, 1911 |
| 1,682,405 | Naatz | Aug. 28, 1928 |
| 2,091,580 | Belinski | Aug. 31, 1937 |
| 2,512,824 | Brown | June 27, 1950 |

FOREIGN PATENTS

| | | |
|---|---|---|
| 16,033 | Great Britain | of 1891 |
| 188,270 | Germany | Mar. 27, 1906 |
| 679,769 | France | Jan. 13, 1930 |